US009503486B2

(12) United States Patent  
Sukoff et al.

(10) Patent No.: US 9,503,486 B2  
(45) Date of Patent: Nov. 22, 2016

(54) CONFIGURING, NETWORKING, AND CONTROLLING A PLURALITY OF UNIQUE NETWORK-CAPABLE DEVICES

(71) Applicant: Sookbox LLC, Cambridge, MA (US)

(72) Inventors: David Sukoff, Bedford, MA (US);  
Cyrus Vafadari, Cambridge, MA (US);  
Mathew Peterson, Boston, MA (US);  
Adam Mustafa, Cambridge, MA (US)

(73) Assignee: Sookbox, LLC, Cambridge, MA ( * ) Notice: Subject to any disclaimer, the term of this patent is extended or adjusted under 35 U.S.C. 154(b) by 381 days.

(21) Appl. No.: 14/149,726

(22) Filed: Jan. 7, 2014

(65) Prior Publication Data

US 2014/0229625 A1    Aug. 14, 2014

Related U.S. Application Data

(63) Continuation-in-part of application No. 13/734,511, filed on Jan. 4, 2013, now abandoned, and a continuation-in-part of application No. 14/147,397, filed on Jan. 3, 2014, and a continuation-in-part of application No. 14/149,541, filed on Jan. 7, 2014.

(60) Provisional application No. 61/749,436, filed on Jan. 7, 2013, provisional application No. 61/749,430, filed on Jan. 7, 2013, provisional application No. 61/857,369, filed on Jul. 23, 2013.

(51) Int. Cl.  
*H04L 29/06*     (2006.01)  
*H04L 29/08*     (2006.01)

(52) U.S. Cl.  
CPC ........ *H04L 65/1069* (2013.01); *H04L 67/125* (2013.01); *H04L 67/10* (2013.01); *H04L 67/12* (2013.01)

(58) Field of Classification Search  
None  
See application file for complete search history.

(56) References Cited

U.S. PATENT DOCUMENTS

| 2006/0122482 | A1* | 6/2006 | Mariotti | A61B 5/0002 600/407 |
| 2010/0131978 | A1* | 5/2010 | Friedlander | H04L 12/2812 725/37 |
| 2012/0159476 | A1* | 6/2012 | Ramteke | G06F 9/5033 718/1 |

* cited by examiner

*Primary Examiner* — Angela Nguyen  
(74) *Attorney, Agent, or Firm* — Richard Baker

(57) ABSTRACT

Configuring a control session comprises receiving a request to execute an input/output application from a content control application executing on a mobile control device and receiving a request from at least one other mobile control device to participate in the control session. Configuring the control session also includes aggregating a plurality of real-world connectable processing nodes into an application session set of processing nodes by allocating at least one function required by the input/output application for execution on each processing node in the set of processing nodes, wherein the set of processing nodes is determined based on processing requirements of the input/output application.

11 Claims, 12 Drawing Sheets

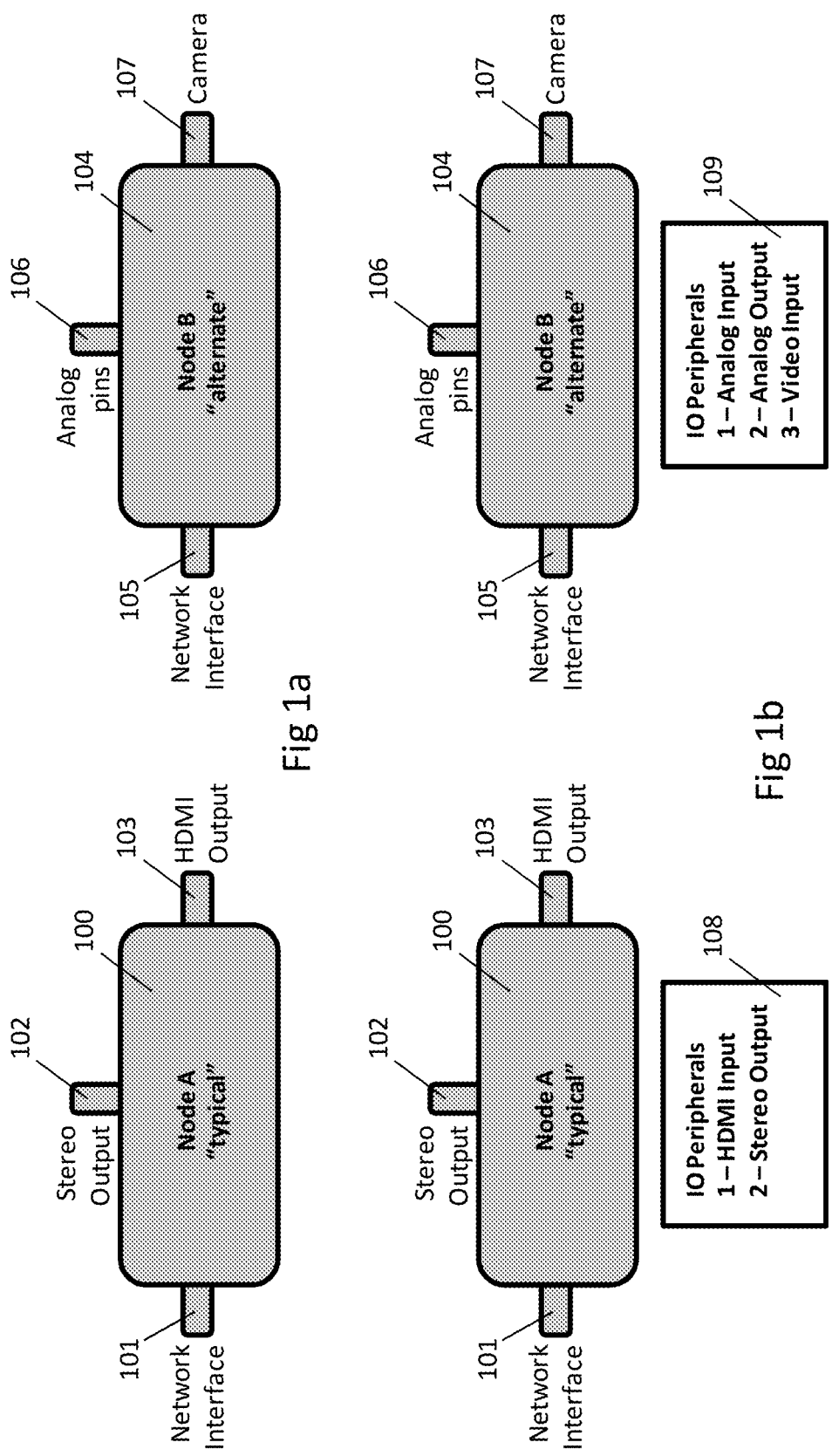

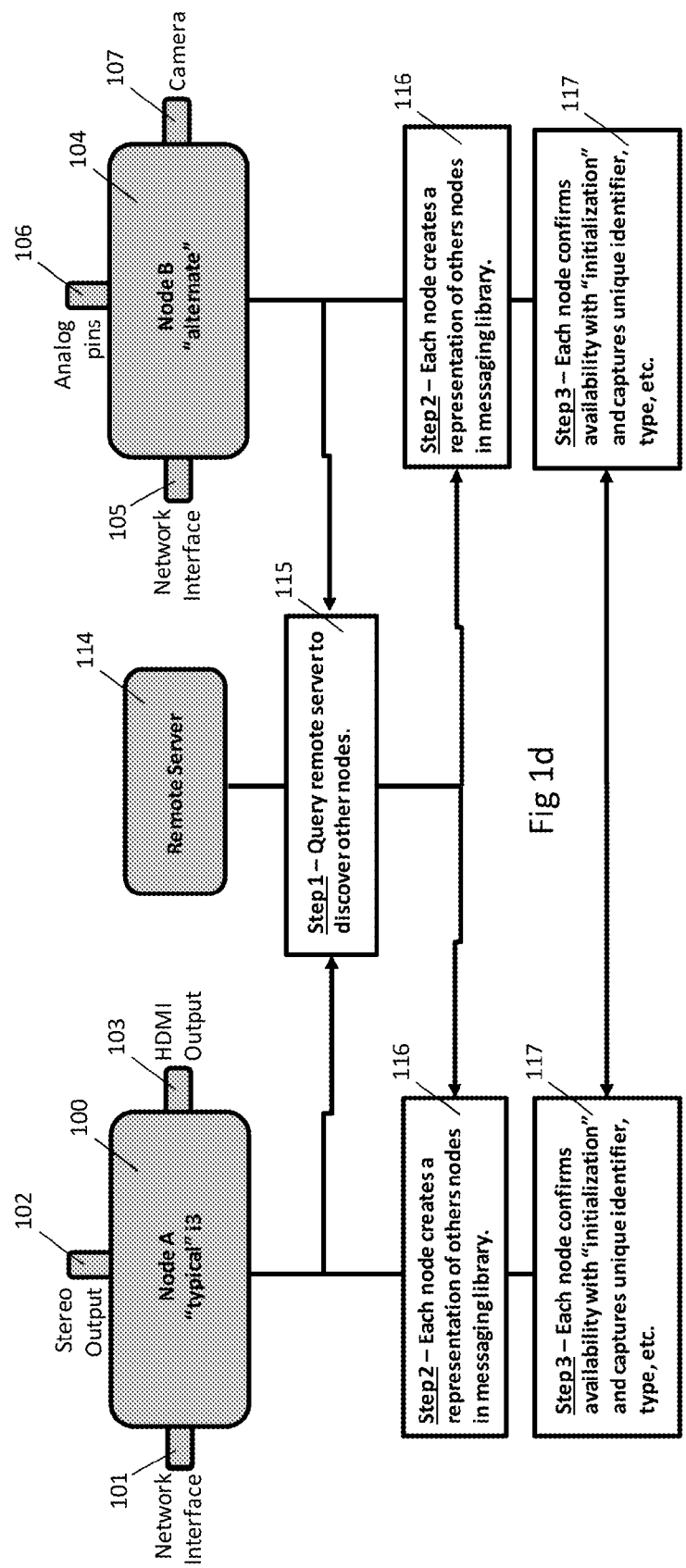

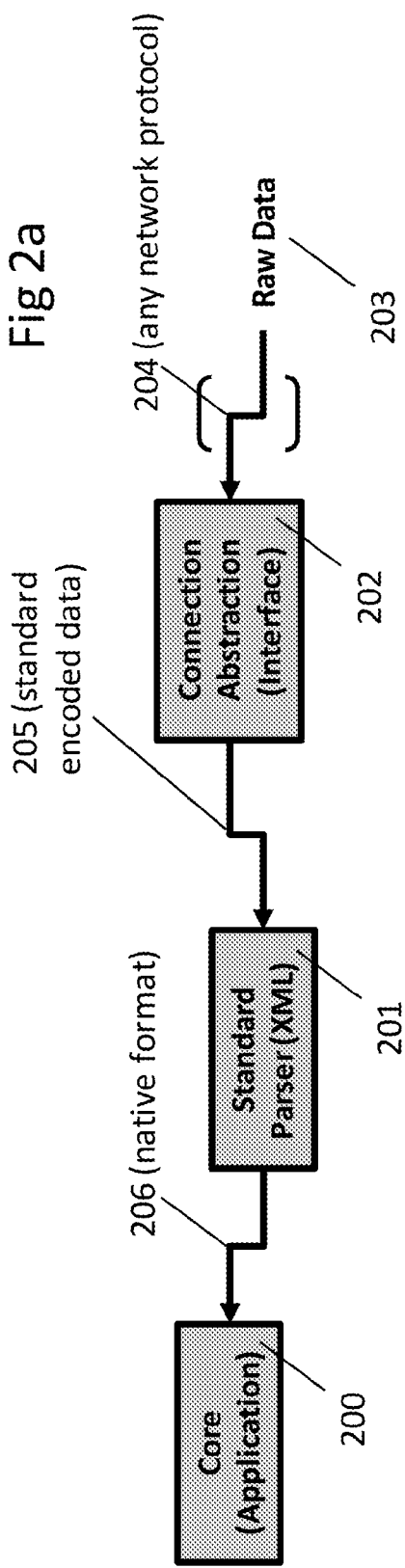
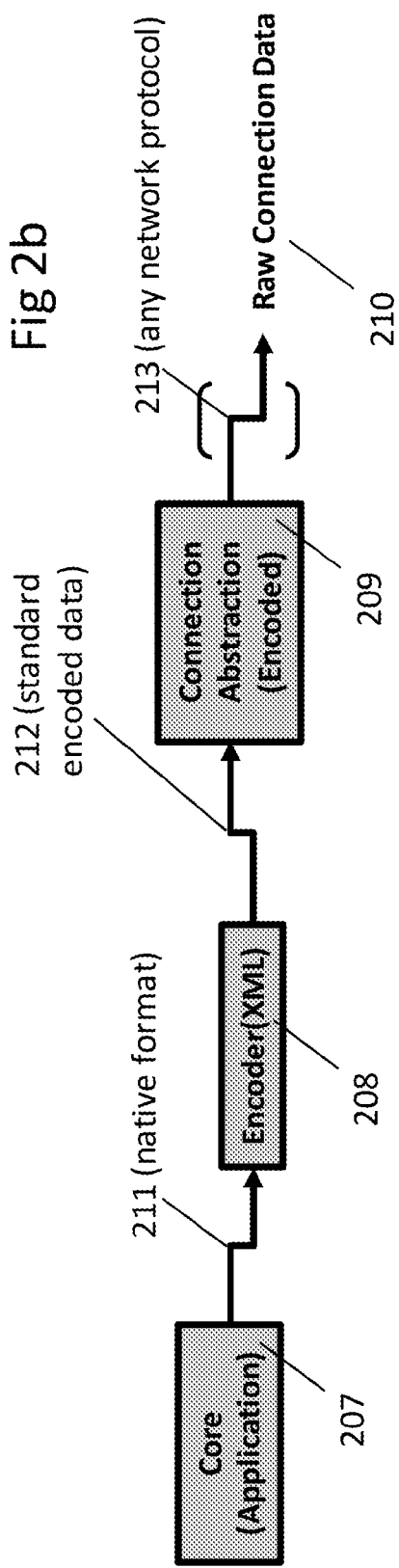

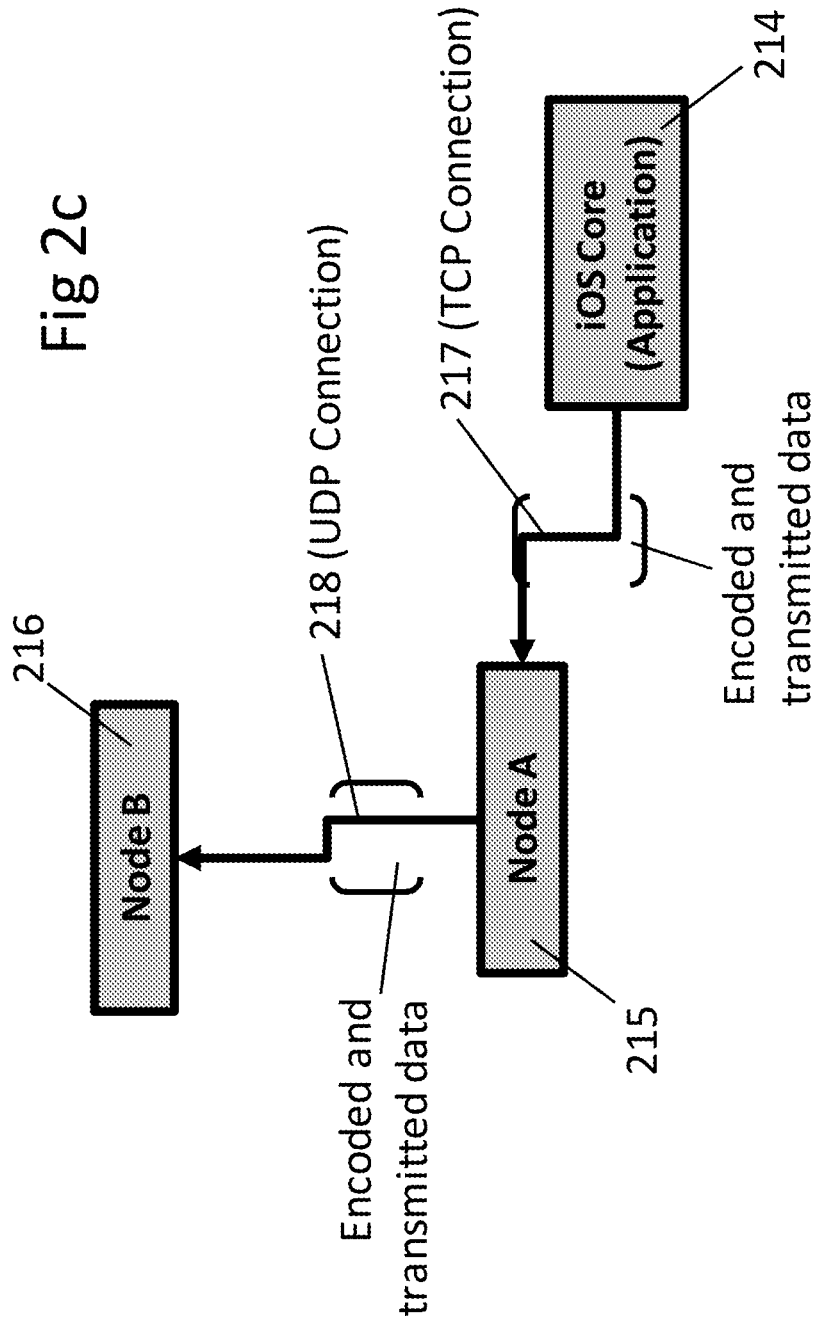

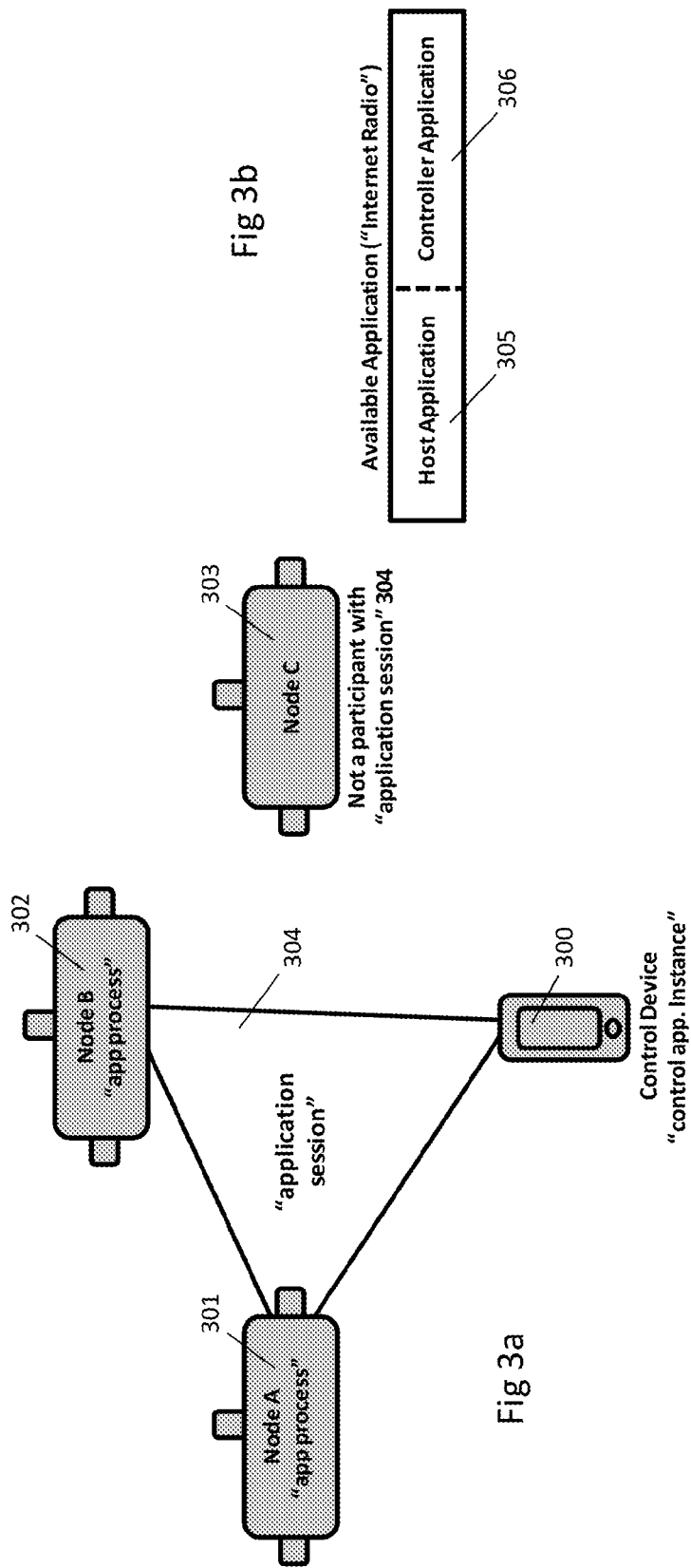

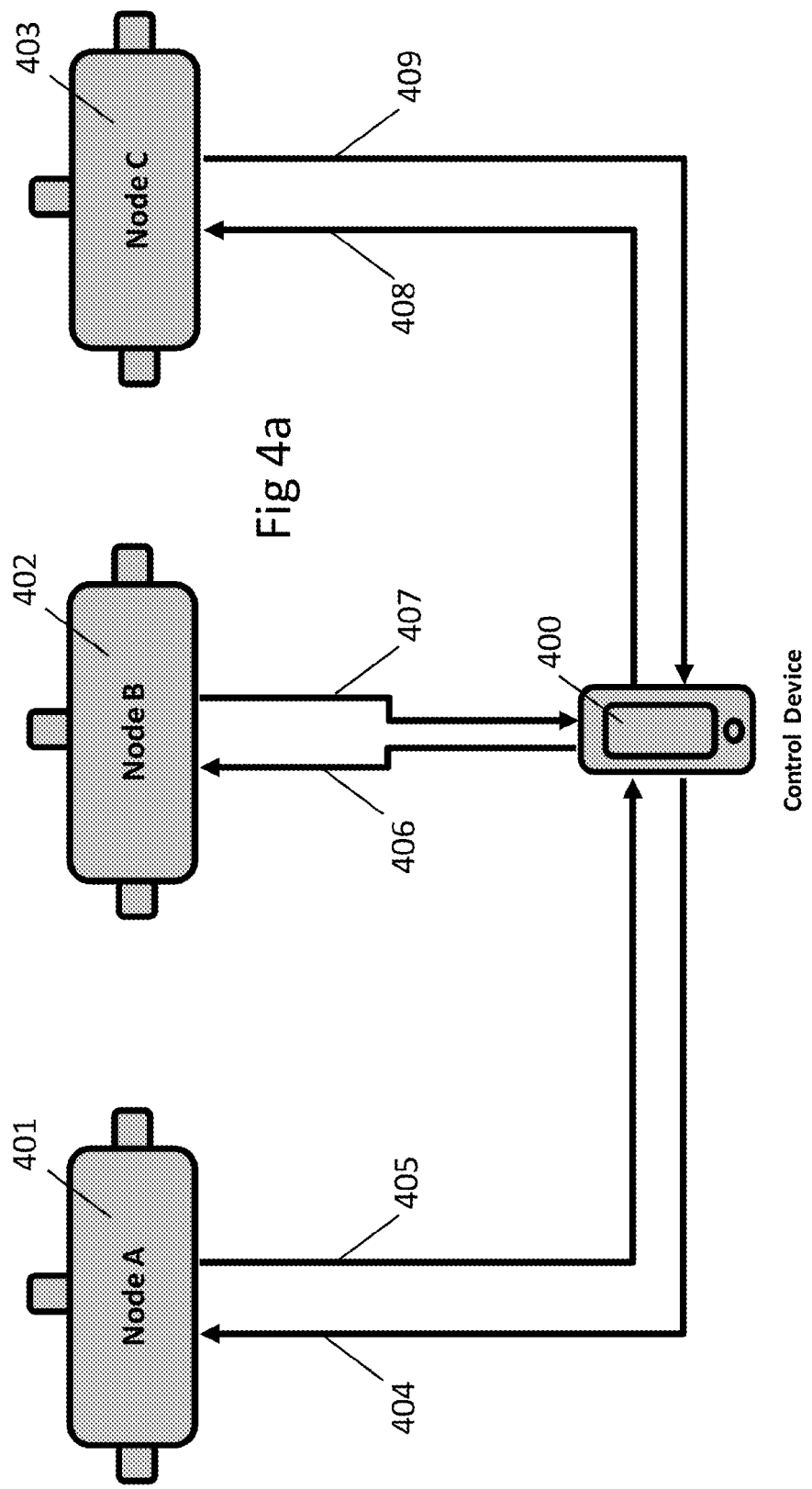

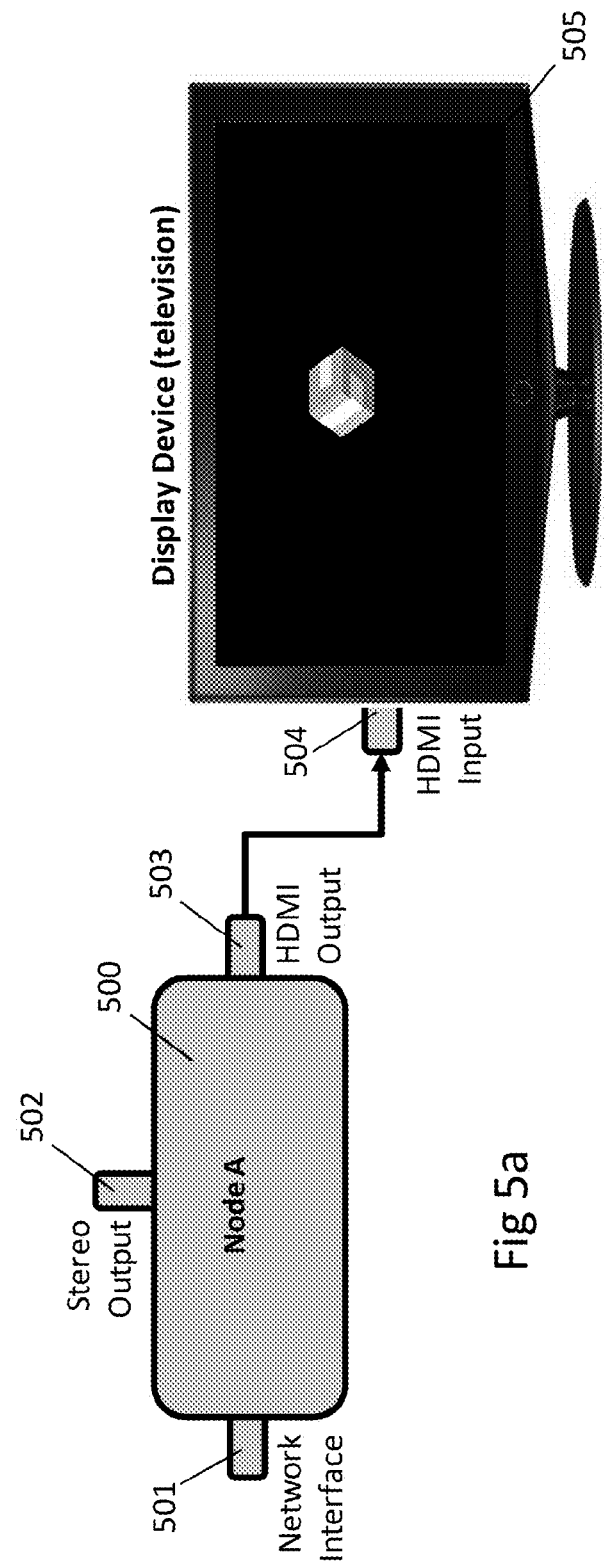

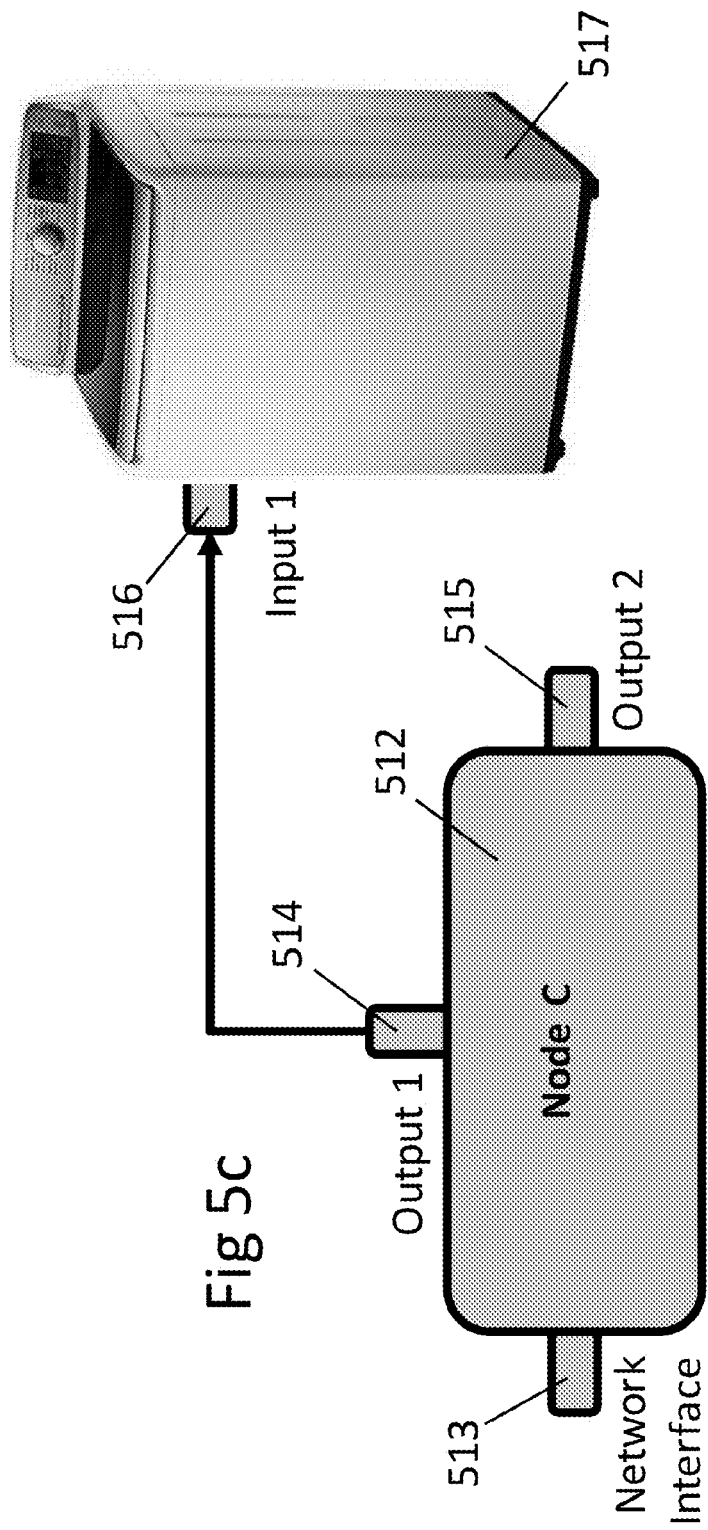

CONFIGURING, NETWORKING, AND CONTROLLING A PLURALITY OF UNIQUE NETWORK-CAPABLE DEVICES

CROSS-REFERENCE TO RELATED APPLICATIONS

This application claims the benefit of the following provisional applications, each of which is hereby incorporated by reference in its entirety: U.S. provisional application 61/749,436, filed Jan. 7, 2013, U.S. provisional application 61/749,430, filed Jan. 7, 2013, and U.S. provisional application 61/857,369, filed Jul. 23, 2013.

This application is a continuation-in-part of U.S. patent application Ser. No. 14/147,397 filed Jan. 3, 2014 that is incorporated by reference herein in its entirety and that claims the benefit of the following provisional applications, each of which is hereby incorporated by reference in its entirety: U.S. provisional application 61/749,436, filed Jan. 7, 2013, U.S. provisional application 61/749,430, filed Jan. 7, 2013, and U.S. provisional application 61/857,369, filed Jul. 23, 2013.

This application is a continuation-in-part of U.S. patent application Ser. No. 14/149,541 filed Jan. 7, 2014 that is incorporated by reference herein in its entirety and that claims the benefit of the following provisional applications, each of which is hereby incorporated by reference in its entirety: U.S. provisional application 61/749,436, filed Jan. 7, 2013, U.S. provisional application 61/749,430, filed Jan. 7, 2013, and U.S. provisional application 61/857,369, filed Jul. 23, 2013.

This application is a continuation-in-part of U.S. patent application Ser. No. 13/734,511, filed Jan. 4, 2013, the entirety of which is incorporated herein by reference.

BACKGROUND

Field

The methods and systems described, depicted, and claimed herein may relate to managing and distributing the separation of media content and associated controls within a network system.

Description of the Related Art

In the modern homes of today there typically are multiple means for receiving and displaying digital content on various display devices. Also, there are various electronic devices throughout the home that are networked together in a fashion for providing the user with a means for entertainment which often include, but are not limited to, personal computers, televisions, Internet television ("smart" televisions), digital video disk (DVD) players, compact disk (CD) players, set-top boxes (STBs), audio/video receivers (AVRs), digital video recorders (DVRs), gaming devices, digital cameras, smart-phones tablets, etc. Also, networked connected devices may also be adapted to receive content from multiple inputs representing Internet Protocol (IP) input connections.

Even with all of the advancements discussed above, there still are vast limitations in user experience for many of the devices and especially when used together. For example, while browsing the Internet on digital television (either directly or indirectly through a set-top box), the user experience is typically negated by cumbersome navigation of a complicated website, either with an attached keyboard, or limited static unidirectional remote control. Typically, personal computers (PC) work better for controlling than an Internet connected television for a user to browse the web. However, the Internet connected television can surpass the user experience than that of the personal computer (PC) experience in cases where it is used for playing high-resolution video, surround sound audio, and/or displaying content in a social/entertainment settings.

Conversely/similarly, in displaying digital content on a television that is typically viewed on a personal computer (PC) is also cumbersome. Typically, typing/searching for a webpage URL on a browser window of the television display is often challenging and limited by the television's remote control with static and unidirectional buttons features rather than the easier and more commonly known utilization of a mouse and keyboard on a personal computer (PC).

Another recent trend with respect to consumer electronic devices (more specifically, mobile devices, such as smart-phones, tablets, etc.) is that they have become increasingly affordable. In addition, the consumer electronic devices increasingly include more advanced features. These features allow homeowners to enhance their home entertainment user experience for the specific implementations of which those electronic devices are designed and sold for. As consumer electronics devices continue to become more available and improved for the user, the user's desire to access various types of digital content provided by various digital content sources (providers) also continues to grow. Unfortunately, since these consumer electronic devices such as, but not limited to, smart-phones, tablets are capable of retrieving and rendering digital content from the Internet or other networks, they are more typically designed to present the content in personal manner (smaller screen) for the single device user. Larger display devices, such as, but not limited to televisions are more typically designed to present better quality formats of video, such as high definition televisions (HDTVs) for a better and shared (more than one user) user experience.

Currently, users' access to and control of digital content throughout their home is often limited to the fractional utilization of which that device is designed for application types (e.g. watching movies, listening to music, playing games, etc.) and the various associated output and control device types throughout the various zones. Additionally, in the paradigm of consumer electronics growth and affordability it has become increasingly difficult for users to easily manage (control) and stream digital content seamlessly and transparently throughout the various output devices and associated locations (zones) cognizant of growing device control needs and associated digital content implementations (use cases) for a seamless user experience.

SUMMARY

Embodiments of the present disclosure include methods, systems, or computer readable medium, with program codes embodied thereon, for configuring, networking, and controlling a plurality of unique network capable devices, nodes and associated peripherals within a network system. Some terms to be used in the present disclosure are defined below in more detail.

A node refers to a network-capable computing device capable of running software. Each node has two software categories: applications and core. Applications refer to specific code corresponding to an available application. Core refers to messaging protocols, loading of resources, organizational and managerial functions, and any other requisite functionality outside an application.

Input/output (IO) peripheral refers to a piece of hardware able to be manipulated by a node, and allowing a user to input to our receive output from the node. This may include, but is not limited to, a video card with HDMI out, a sound card with stereo line out, a camera allowing video in, or analog pins allowing input and output signals similar to Arduino pins) which can manipulate a variety of different hardware devices.

Control devices refer to a node with IO peripherals allowing users to view a controller user interface and input controls. This may include, but is not limited to, a smartphone, tablet computer, laptop computer, or personal computer, etc.

Available application refers to an application capable of being instantiated on any node, control device, or combination thereof. An application session may include processes running on any number of node devices capable of exchanging messages over a network. An available application is comprised of one or more (two in a client-server modeled application) different classes of applications host application and control application. Examples include a media player, video game, or an alert/notifier.

An application session refers to an instance of an available application. An application session may have any number of nodes or clients actively or passively participating. An application session, unlike a typical computer application, is a multi-device unit, where multiple processes on multiple computing devices may act as a single unit.

A host application refers to the application playing the role of "server" of an available application of the client-server model. A host application may run on any node.

A control application refers to the application playing the role of "client" of an available application of the client-server model. A control application may run on any control device.

A node-capable messaging library refers to a library of software functions capable of exchanging meaningful messages among nodes and control devices.

The embodiments of the current disclosure include a network of nodes with a variety of IO peripherals capable of hosting application sessions with multiple nodes and control devices. Furthermore, this network of nodes will make available to any other node or control device information about the number, nature, and status of any available applications, active application sessions, or IO peripherals, as well as the relationships among them. Thus, from a single control device, a user can monitor any number of IO peripherals, active sessions, and available applications.

In an embodiment, each node is capable of resource loading. Resource loading refers to the process of the software on a given node identifying, organizing, and making available its IO peripherals, available applications, and other nodes. Thus, using an operating system such as Linux, a node can determine its architecture (such as processing power), and IO devices (such as number of HDMI outputs or analog pins). The status of these peripherals can be monitored and communicated to other nodes upon request. The setup may also include determining which available applications the device can support (perhaps limited by IO peripherals or processing power).

In an embodiment, each node is capable of connecting to other nodes and passing meaningful messages. The node includes a software library that includes functions for connecting to other nodes with a network connection (such as, but not necessarily TCP), encoding messages (such as an XML string encoding), decoding messages (such as XML string decoding), and passing said information to the node's software. Armed with a node-capable messaging library, processes residing on a node may communicate information (such as data, methods to be executed remotely, etc.) to a process of that application session on another node (such as the control device).

Each node is capable of running application processes. An application process is a process with a node-enabled messaging library capable of running on a node. An application processes is typically, but not necessarily, at least a partial instantiation of an available application. That is, an available application of a client-server model could have a host application installed on host nodes, and a control application installed on control devices. A node may instantiate the host application, and a control device may instantiate its client application, which includes a user interface. Other combinations are possible (e.g.—This includes session application status as a process in addition to the processes within the session application instance itself).

In a preferred embodiment, a control device is capable of presenting resources (IO peripherals, available applications, and application sessions) from a network of nodes in a single interface. Thus, a network of nodes can be interacted with as a single node. In a concrete example, a control device may have a "dashboard view" in which it presents a table of available applications, a table of active sessions, and a table of available IO peripherals. The models behind these tables include information from each node, and the relationships between elements. For example, selecting an "internet radio" available application would display to the user an option of only the available "audio" IO peripherals on only nodes which support "internet radio" available application.

Many embodiments of the present disclosure include applications of the aforementioned system applied with a variety of different nodes. Example devices include, but are not limited to, television dongles, smart-televisions, headphones, stereo receivers, wearable devices, remote control cars, thermostats, or a laundry machine. Note that the term "dongle" is commonly known to the art as small devices that plug into a computer, computer readable medium, or any other device capable of discerning it as an input, serving as an adapter or extendible utilization supported by software or the like and with similarly paired IO connection types to the external device it is paired with. Further note that the term "wearable" is also commonly known to the art as referring to computer-powered devices or equipment that can be worn by a user, including clothing, watches, glasses, shoes and similar items. Typically, wearable computing devices from providing specific features (e.g. heart-rate monitor, pedometer, etc.) to advanced smart features (e.g. small-phone, smart-watch, etc.). These "wearable" computing devices are becoming more commonly known and mainstream. Any of these devices, integrated as a node, could participate in application sessions, share IO peripheral information, and share session information.

Methods and systems relating to managing and distributing the separation of media content and associated controls within a network system may include a method of configuring a control session. Such a method may include various steps, such as receiving a request to execute an input/output application from a content control application executing on a mobile control device; receiving a request from at least one other mobile control device to participate in the control session; aggregating a plurality of real-world connectable processing nodes into an application session set of processing nodes by allocating at least one function required by the input/output application for execution on each processing node in the set of processing nodes, wherein the set of processing nodes is determined based on processing requirements of the input/output application; and configuring at least one node of the set of processing nodes to facilitate interfacing the input/output application with a real-world input/output device that is connected to the at least one processing node via the function of the at least one processing node, wherein configuring is based at least in part on input/output requirements of the input/output application.

Configuring at least one processing node in this method may include instantiating the at least one function allocated to the at least one processing node. Each processing node in the set of processing nodes may exchange information that is pertinent to the execution of the application via a messaging library that supports information abstraction to/from an information processing format from/to an information exchange format. Likewise the first format is a processing node-specific format and the second format is a common network information exchange format.

Alternatively in this method, configuring at least one node of the set of processing nodes may include at least one processing node performing the following steps: querying a remote server to discover other processing nodes; creating a representation of other processing nodes in a node-resident messaging library; and confirming availability to receive a function required by the input/output application.

Certain embodiment of this method may include at least one processing node in the plurality of processing nodes not participating in the set of processing nodes. Likewise, at least one of the set of processing nodes may be indirectly accessible by the mobile control device via another node of the set of processing nodes.

In this method, the real-world input/output device that is connected to the at least one processing node may be connected via at least one of an HDMI connection, an audio connection, a video capture connection, and a home appliance control connection.

Methods and systems relating to managing and distributing the separation of media content and associated controls within a network system may include an input/output processing system, that may comprise a variety of components including: a content control application executing on a mobile control device for configuring a content control session based on interpretation of user actions recorded by a user interface that is native to the mobile control device, wherein the content control session is configured with a content input/output application selected through the user interface; a host content control application that is adapted to aggregate a plurality of real-world input/output processing nodes into a set of processing nodes for collectively executing the content input/output application; a plurality of functions that collectively determine the operation of the input/output application; a plurality of different types of input/output devices connected individually to distinct processing nodes in the set of processing nodes; and an application instantiation facility for identifying the set of processing nodes and for instantiating each function of the plurality of functions on distinct processing nodes in the set of processing nodes, wherein input/output requirements of each function of the plurality of functions is used to determine into which processing node the function is instantiated based on a class parameter of the distinct processing nodes. The class parameter in this system may identify the type of input/output devices that are connected to the distinct processing nodes. Also, in this system a processing node may adjust its class parameter based on the instantiated function.

Methods and systems relating to managing and distributing the separation of media content and associated controls within a network system may include a system of components comprising: a set of mobile control devices among a plurality of control devices with which a host server has established socket protocol-based communication via a network; a set of real-world output devices that are accessible by the host server over the network; a control session configured by the host server to facilitate executing an application for controlling content presented on the set of output devices based on information received from the set of mobile control devices; and a set of real-world output device connectable processing nodes that are connected to at least one other real-world connectable processing node via a network interface port of the nodes, the set of real-world connectable nodes for collectively executing an application of the control session by individually executing at least one function required by the application, wherein at least one of the set of processing nodes connects to at least one of the set of real-world output devices on which the content is presented. In this system the host server may be a processing node adapted to execute a host server application.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIGS. 1A-1D illustrates examples of the key embodiments within the invention as associated with an example node for loading resources.

FIGS. 2A-2C illustrates examples of the key embodiment within the invention as associated with connection representation for messaging library.

FIG. 3A illustrates and example of the key embodiment within the invention as associated with the relationship between application sessions and application processes.

FIG. 3B illustrates an example of the key embodiment within the invention as associated with the relationship between control applications and host applications.

FIG. 4A-4C illustrates an example of the key embodiment within the invention as associated with resource aggregation in a fully connected graph for an aggregation interface.

FIG. 5A illustrates example device embodiments within the invention, such as a smart TELEVISION dongle.

FIG. 5C illustrates example device embodiments within the invention, such as a laundry machine.

DETAILED DESCRIPTION

Figure 1C:
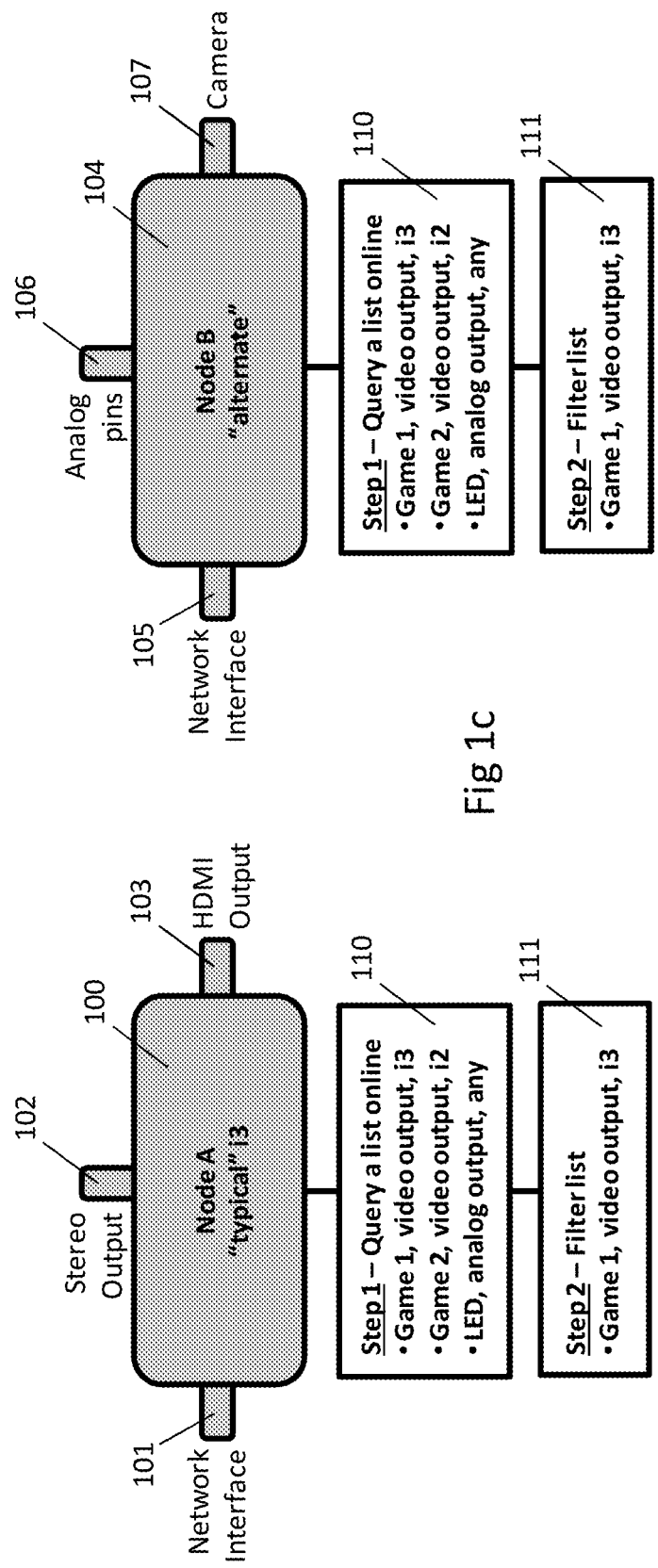

One skilled in the art will realize the disclosure may be embodied in other specific forms without departing from the spirit or essential characteristics thereof. The foregoing embodiments are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

In an embodiment, a node is capable of loading resources. FIG. 1A depicts two nodes which are 1) a typical node A 100 comprising a network interface 101, an audio or stereo output 102, and an HDMI or video output 103 and 2) an alternate node B 104 comprising a network interface 105, analog IO pins 106, and a camera 107. In this example, the nodes 100, 104 use a Linux operating system. Various resource loading processes may be triggered as a part of the node boot sequence, periodically, by an event such as a D-Bus event, upon application initialization, upon message reception, or any other time. Resource loading processes load and organize a node's resource loading, loading IO peripherals, available applications, and connections to other nodes on the network. Any resource loading process or sub-process may be executed independently, at the same or different times, by any number of triggers. The resource loading process may consist of various other device-specific or IO peripheral-specific processes such as initializing analog pins, determining system architecture, or loading device drivers, but the minimum requirement is discovery of the peripheral resources, installed application resources, and network resources.

FIG. 1B depicts a possible resource loading processes for discovering, loading, and/or organizing IO peripherals, etc. Any node, or combinations thereof (e.g. in this figure nodes are represented as "typical" 100 and "alternate" 400 nodes) having software list of IO peripherals 108, 109 available. Note that before the resource loading initialization process begins, the core software within any node is initially empty in the "before" list. Then, in the sequence of commands is executed. In command 1, both nodes query their audio managing software (e.g. ALSA) for available audio output devices, and load discovered audio-out devices are configured and saved in their respective IO peripherals, as shown in 108 and 109. As depicted in this FIG. 1B, only node A 100 discovers stereo output peripherals 102. In command 2 any node (e.g. node A 100 and node B 104) queries their kernel PCI managing software to discover any HDMI outputs and add any discovered HDMI output peripherals to their respective IO peripheral lists (108, 109). Further note that only node A 100 discovers HDMI output peripherals 103. Next, in command 3 any node (e.g. node A 100 and node B 104) queries their operating systems for analog pins and add any discovered analog pin peripherals to their respective IO peripheral lists (108, 109). In this example, only node B 104 discovers analog pins 106, and further discovers that they are both capable of input and output 109. In command 4, the any of the nodes (e.g. node A 100 and node B 104) queries their kernels for USB cameras and add any discovered cameras to their respective IO peripheral lists (108. 109). In this example, only node B 104 discovers a camera 107. The resulting IO peripherals lists 108, 109 are depicted in the "After" list. Each node's IO peripheral list 108, 109 are available as a resource to other software on each of the any other local nodes (e.g. node A 100 and node B 104), as well as other nodes via a node-capable messaging library that are not local. Note that an IO peripheral loading process may be run at any time (e.g. run the commands each time D-Bus alerts the connection of a new hardware device), may include more or fewer steps (e.g. starting ALSA could be a step), and may be device-specific (e.g. a node could have different code than another node).

FIG. 1C depicts a possible setup process for discovering, loading, and organizing available applications. In this example, node A 100 and node B 104 have already discovered, organized, and exposed their IO peripheral devices, as well as their processors. In this embodiment, as depicted in step 1 110 each of the nodes 100, 104 queries a list of possibly available applications from a remote server on the internet, perhaps including in the query user information and authentication. The list of initial applications could also have been stored locally, or synthesized in any other way. In this case, the list of possibly available applications includes the system requirements for running said application, including required IO peripherals and required minimum processor. Also, as depicted in step 2 111, each of nodes 100, 104 filter the lists of possibly available applications using its own list of IO peripherals and processor information. The final filtered list 111 of available applications for node A 100 includes only game 1, since game 2 requires a more powerful processor and LED requires analog output pins. The final filtered list 111 of available applications for node B 104 includes only LED, since both game 1 and game 2 require a video output. The list of available applications for each node is accessible through a node-capable messaging library.

FIG. 1D depicts a possible setup (e.g. resource loading) process for discovering and tracking other nodes. Given the network interfaces 101, 105 made available by the operating system and a pre-loaded messaging library, nodes 100, 104 can discover other nodes and their types. In step 1 115 of one embodiment, both node A 100 and node B 104 are configured to query a remote server for a list of other nodes to connect to (e.g. a "connection group") and their IP addresses. There are other methods for discovering a connection group (e.g. UPnP, etc.) and other protocols for connecting and passing messages (e.g. IPv6 or ARPANET). In step 2 116, both node A 100 and node B 104 creates a connection representation of other nodes available to the node-capable messaging library. A list of other nodes may be further refined as shown in step 3 117, where both node A 100 and node B 104 confirms their availability to other nodes with an "initialization" message. Such an initialization message may also include information such as unique identification of the node.

In an embodiment, node A 100 and node B 104 are capable of connecting to other nodes and passing "meaningful" messages. Here, meaningful is defined as the ability to send information which an analogous messaging library receiving said message can interpret as data able to be used by a node's software (e.g. resource loading, application, or core). One way to send meaningful messages is through the use of an Internet Protocol (IP) network socket protocol, such as Transmission Control Protocol (TCP) or User Datagram Protocol (UDP). While there are many networking protocols (e.g. Bluetooth, Radio Frequency, etc.), TCP is particularly useful in illustrating an example embodiment of a node-capable messaging library: TCP requires a connection to initialize, and this connection stays live throughout its use, unlike HTTP or UDP which are "stateless" (e.g. each message is independent of the previous ones), TCP connections are bi-directional (e.g. either end can initiate a message), and TCP protocol has low over-head relative to HTTP or other protocols built on top of TCP. Thus, each node has a connection representation implemented in some networking protocol connecting the node to other nodes, depicted in FIG. 2A. Another type of protocol other than TCP may have a connection abstraction representation with these similar properties (e.g. cookies do part of this in HTTP).

FIGS. 2A-2C further represents an encoding/decoding library. In this embodiment, a node's core or application software 200, 207 is capable of exchanging meaningful information (e.g. send/receive data, remote function calls, etc.) regardless of the language or native format 206, 211 of the node. In this embodiment, a node uses two tools to accomplish this goal which are 1) a standard parser 201 or standard encoder 208, and 2) a connection abstraction 202, 209.

FIG. 2A represents a node receiving data. First, raw data 203 is received over a network over some protocol. This protocol could be any protocol, such as TCP, UDP, HTTP, morse code, ARPANET, etc. A connection abstraction 202 specific to the network protocol interprets the raw data and transforms it into standard encoded data 205. Standard encoded data 205 could be XML string standards. Thus, a connection abstraction provides a consistent interface for its appropriate network protocol. A TCP socket abstraction is a standard connection abstraction provided by an operating system such as Linux. It provides a standard interface to connect, send or receive messages initiated by either end of the connection, and persistence of the abstraction across messages. Thus, a connection abstraction can be created around an otherwise connectionless protocol. For example, HTTP, which is connectionless since only clients can initiate a message and there is no persistence between messages, can be encapsulated in an abstraction in which both ends act as servers (e.g. either side may initiate a message) and tokens and cookies are used to establish persistence between messages. Standard encoded data 205 can be parsed by a standard parser 201 and converted into a node's core or application 200 native formats 206, which can be interpreted by a node's core or application 200. The node's core or application 200 can be written in any e language supported by a given standard parser 201.

Similarly, FIG. 2B demonstrates a method for sending a message in any formatted core application across a network. First, a node's core or application 207 written in any language or format sends natively formatted data 211 to an encoder 208. Again, this encoder 208 must be specific to the native format 211. The encoder 208 encodes natively formatted data into a standard format such as XML, and this standard encoded data 212 is sent to a connection abstraction 209. This connection abstraction interprets standard encoded data 212 and converts it to raw connection data 210 encoded in the network connection protocol the specific connection abstraction 209 is capable of handling.

With FIGS. 2A and 2B, it is demonstrated that any node written in any native language may communicate to any other node with meaningful messages at any given time. FIG. 2C demonstrates and clarifies the established functionality in a concrete example case where an iOS application sends a message to an indirectly connected node's application written in JAVA. First, the iOS application 207 sends its natively formatted data 211 to an XML encoder 208. This specific XML encoder is written to accept iOS formatted data inputs and output XML standard encoded data 212. The standard encoded data 212 enters a TCP connection abstraction and sends the data to the other end of the connection abstraction via the TCP network 217.

Node A receives the data using steps described in FIG. 2C. The node's core, upon reading the message, could determine that node B 216 is the desired recipient. Then, using the process described in FIG. 2B, it could send the data to node B 216. Note that the core of node A 215 could be written in any language independent of the language of the iOS application 214 and node B 216. Further note that node A 215 requires a connection abstraction 209 capable sending data over a UDP network in order to communicate with node B 216. Node B 216 receives the UDP encoded message 204 in its connection abstraction 202, and using the method described in FIG. 2A, passes the message into its application 200.

The definition and usages of available applications, application sessions, application processes, host applications, and control applications are further explained in FIG. 3A. An available application (e.g. internet radio, etc.) does not refer to a specific existing instance of internet radio, but rather the code that allows it to be instantiated. This is in contrast to an application process, which refers to a running instance of a process which is part of an application, rather than the whole. A process (e.g. application process) can run only on a single node (e.g. by the definition of process in terms of standard operating systems), but a group of processes can act together as a single instance of an available application, known as an application session 304. Thus, an application session 304 is a collection of one or more application processes (e.g. node A "application process" 301 and node B "application process" 302, and control device 300), whose code was defined in an available application. Further note that the application session 304 control application instance is shown on control device 300. Also, note that in this example if FIG. 3A, the node C 303 is not sharing in the application processes of node A 301 and node B 302, thus is not a "participant" in the active session application 304.

FIG. 3B shows how a single available application 305 could have various different executables designed to be run on different nodes. In this example, the available application (e.g. internet radio) is comprised of both a host application 305 and a controller application 306. Upon instantiation, a host application 305 process of the internet radio may accept messages (e.g. using a node-capable messaging library) from a controller application 306 process, as these application processes would have been designed to communicate meaningfully to act as a single unit, or as a uniquely identifiable application session 304 (as shown in FIG. 3A).

In a preferred embodiment, information regarding resources (application sessions, available applications, IO peripherals, and general message exchange) in a network of nodes can be communicated and aggregated. First, we must establish that a resource on any node can be reached by any other node. This is true for any connected graph of nodes, where edges are network connections between nodes. Thus, when a node comes on line by connecting to any node already in a connection group, it becomes part of that connection group and can receive messages from any other node. In the extreme case where message routing is simplified, each node can make a direct connection to every other node, forming a fully connected graph. Thus, any node may now exchange messages with any other node directly. In a graph that is not fully connected, any from a number of existing algorithms for graph search (including Dijkstra's Algorithm) can be used to locate another node and pass messages. A number of other improvements in message passing efficiency can be used, but the fact that each node can exchange messages with any other node is now established.

The ability of any node to exchange messages with any other node allows for an embodiment where a control device can aggregate all resource information in a single interface.

FIG. 4A demonstrates how a single control device 400 can individually send three messages 404, 406, 408 to nodes A 401, B 402, C 402 and aggregate all resource information. In this embodiment, each node is connected to every other node (401, 402, and 403), and message scan be sent via single direct connection as shown in 405, 407, and 409). In other embodiments different numbers of messages can be sent, and message routing can follow any connection path, as long as the control device 400 candidate is a member of the graph.

Figure 4B:
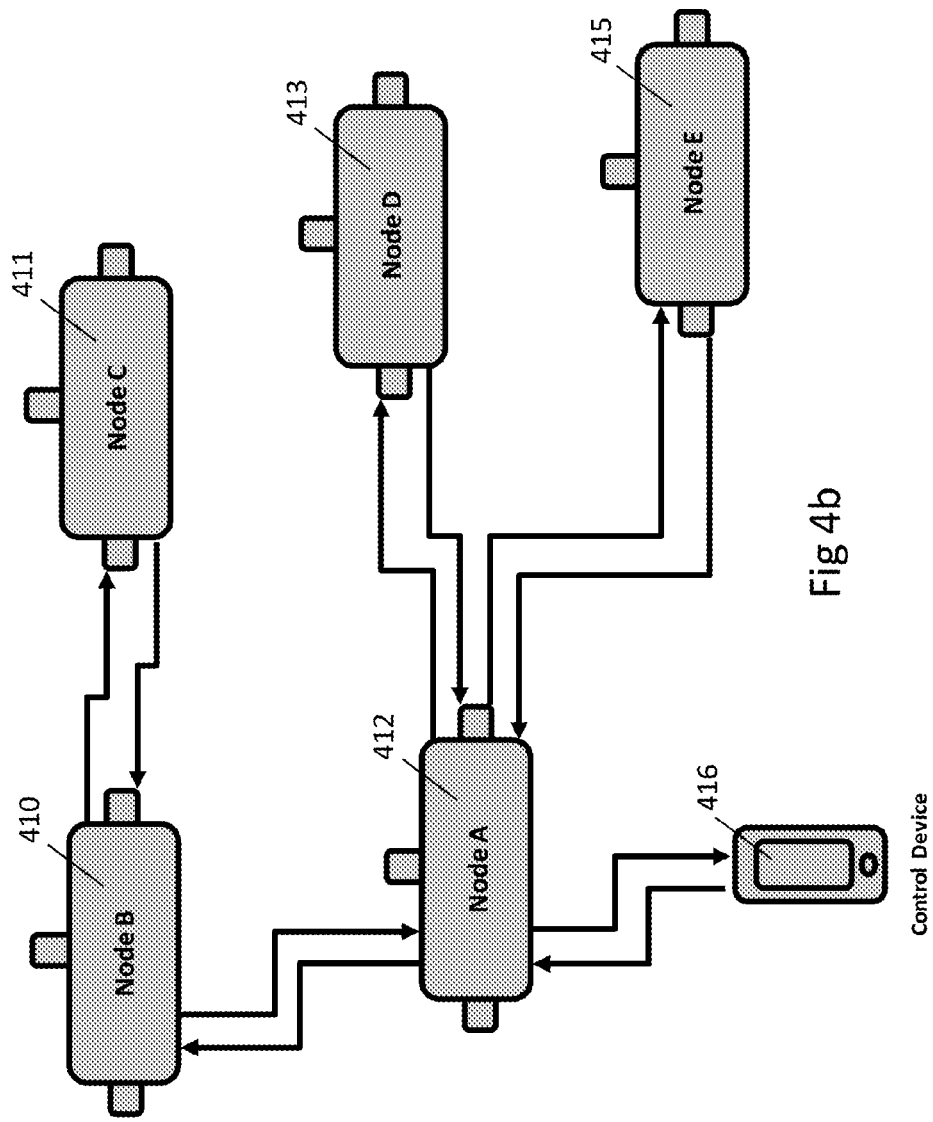

As depicted in FIG. 4B, is another preferred embodiment for a single host node (e.g. node A 412) acting as an interface for a control device 416. In this embodiment, the interface host 412 could have previously aggregated all resource data, or could aggregate it upon receiving an initialization message from a control device 416, or at any other time. Any of the other nodes (e.g. node B 410, node C 411, node D 413, and node E 415) reports their IO peripherals, available applications, and application processes as well as the unique identifier of the application session to which it belongs. Note that node D 413 is connected only to node A 412, and uses node A 412 to relay its messages to the rest of the system.

Figure 4C:
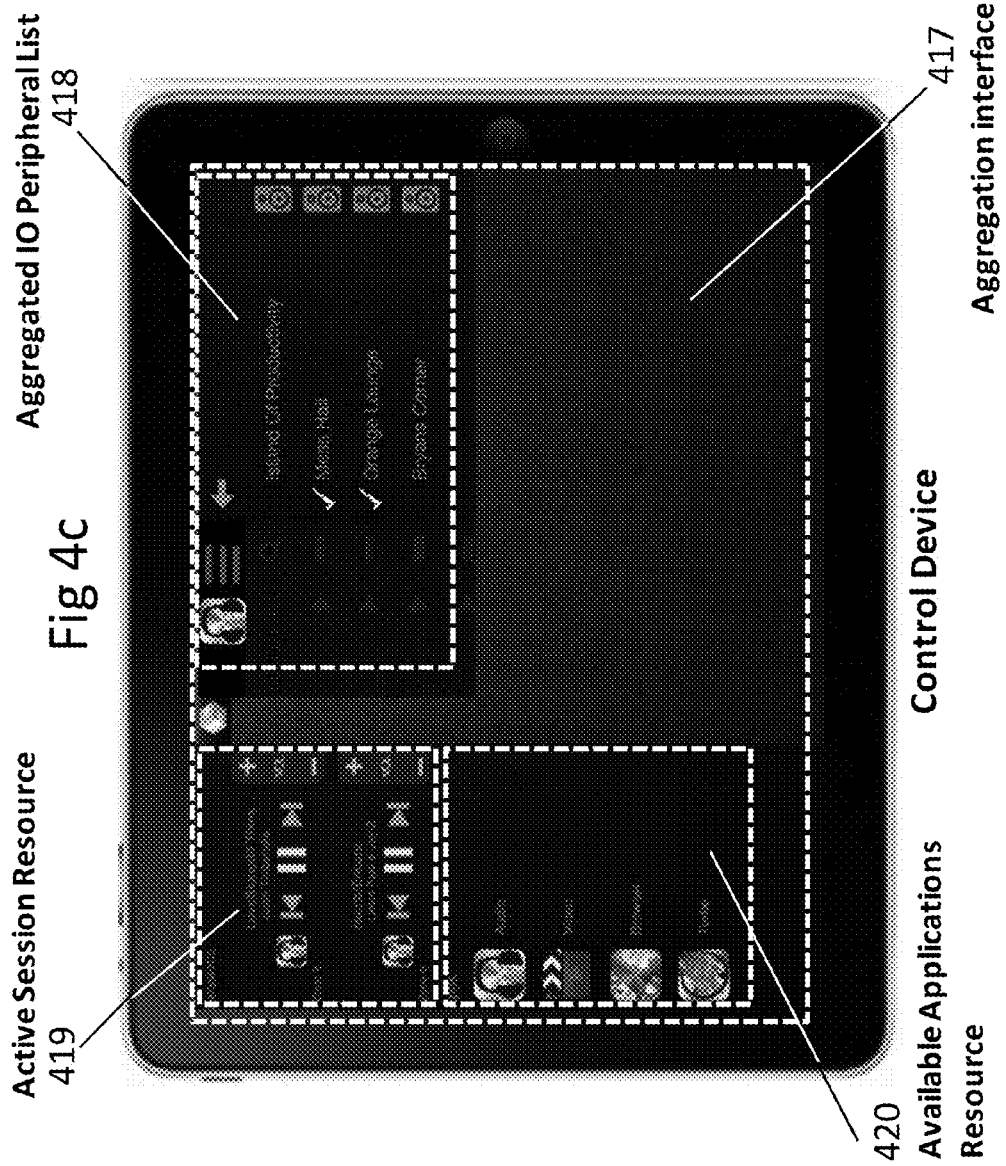

FIG. 4C depicts an example of an embodiment with resource aggregation in a control device. In this embodiment, all resources can be aggregated using a method such as those described in FIGS. 4A and 4B. The aggregation interface 417 displays aggregated information from all nodes where information is displayed with no indication to the user which node provided any given information. The available applications resource 420 displays a list of available applications aggregated from all nodes. Upon selecting an available application to instantiate, an aggregated list of available, allowable IO peripherals 418 can be displayed. Upon selecting a peripheral, a session is activated, and then appears with other the active sessions viewable within the active session resource 419 list. Note that this is just one possible way to create a user interface in such a system.

Note that any of these nodes (e.g. nodes 410, 411, 412, 413, and/or 415) can be embodied in a variety of mechanical and electronic devices. An embodiment of a node A 500 is a TELEVISION dongle, which has a single video or HDMI output peripheral 503 connected to an HDMI input peripheral 504 on a display device (television) 505, as depicted in FIG. 5A. Furthermore, a node could include a node packaged with a television, making a smart-television with a single HMDI or video output peripheral 503. In this embodiment, available applications could include, but are certainly not limited to, internet television, video games, picture viewing, word processing, web browsing, etc. Appropriate, optimized control applications and host applications can be instantiated separately. Multiple control devices or nodes could participate in the same session (e.g. a two player game on two nodes).

Figure 5B:
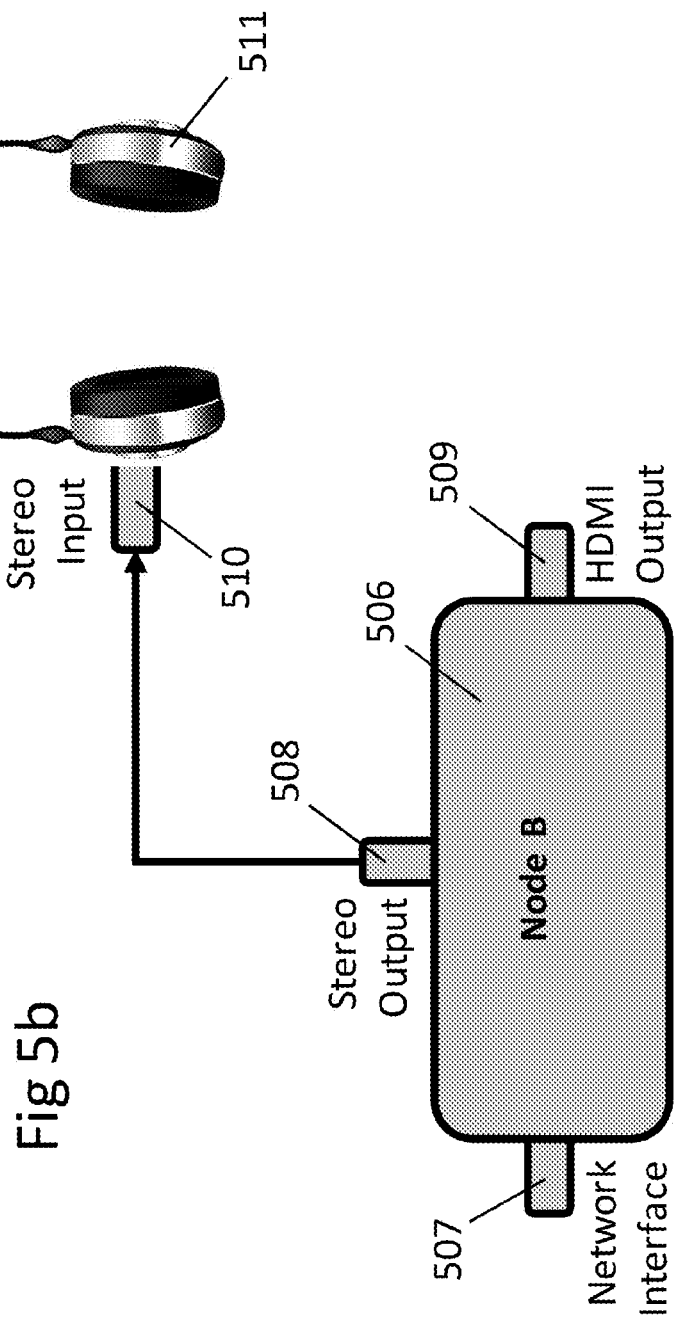
FIG. 5B illustrates example device embodiments within the invention, such as headphones.

Furthermore, any wearable with IO (e.g. an electrical blanket has a thermal output as a peripheral, glasses could have a video and audio out, etc) can be a node. FIG. 5B depicts a node B 506 in a pair of headphones 511 with a stereo output peripheral 508 connected to an input 510.

Home appliances constitute another possible category of nodes. For example, a thermostat may have input peripherals constituting various temperature sensors in a building, and output peripheral constituting a controller for temperature. The thermostat may then be set up to host a "thermostat" available application. Alternatively, a laundry machine could be configured with output peripheral controlling the laundry machine, input peripheral receiving digital information from the laundry machine. A laundry machine application, shown in FIG. 5C, could include a host application on the laundry machine node C 512 capable of manipulating physical laundry machine to perform tasks (e.g. "quick wash", "change temperature", etc.), and a control application could present a user interface for all such functions. The laundry machine node C 512 and the availability of the laundry application could be visible to the user via a singular interface or the like.

A large variety of devices can be configured to participate on a network and share resources. Applications of such a system and method are diverse and may comprise, but are not limited to, some of the following examples such as 1) entertainment based themes such as gaming consoles, televisions, amplifiers, projectors, etc. 2) wearable items such as glasses, clothing, headphones, watches, shoes (e.g. how far have I walked, timing lights to footstep), etc. 3) appliance items such as laundry machine, dryer, dish washer, coffee maker, toaster, oven, thermostat, refrigerator, etc. and 4) other application types such as automobile, airplane seats, any entertainment device in hotel rooms, jukebox at a bar, etc.

Further embodiments of the present disclosure include applications of the aforementioned system and method for configuring, networking, and controlling uniquely identifiable network capable devices and associated nodes types, all of which are described in detail in the summary above.

Embodiments of democratically (e.g. non-discriminatively) managing the separation and distribution of digital content and associated controls in a network may include, but are not limited to, uses of processing nodes that are described herein. These embodiments benefit from the descriptions and figures relating to non-discriminative control device operation in co-pending application U.S. Ser. No. 14/147,397 filed Jan. 4, 2014. Processing node embodiments include operations including receiving a request from any one of a plurality of control devices that participate in an active control session, responding democratically via a processing node configured to perform host server functions to any one of the control device requests, and delivering content and/or control elements via a processing node to a real-world input/output device that is connected to the processing node. Delivering the content may rely upon a control session application function being executed by the processing node. The request from any one of a plurality of control devices may be in the form of data that is representative of command gestures captured in a native user interface of the control device. Such a request may be forwarded to the function configured node that interprets the command gesture data and adjusts the real-world input/output device operation (e.g. change in displayed content) based thereon. The request from any one or more of the plurality of control devices may include a session state change request (e.g. zone change). A processing node receiving such a request may determine an appropriate action (e.g. transferring output to a different display device) and may query other nodes to determine which node best meets the requirements of the request. The result may be a transfer of the specific session application function from the node receiving the request to execute on the node that best meets the requirements of the request. These democratic (e.g. non-discriminative) themed examples of management of separation and distribution of digital content are also user experience optimized for various application types and associated controls, digital content, status information, and the like. Each node may be adapted to participate in user experience optimization during an active content distribution and control session that includes a host node, control devices, real-world connectable processing nodes, and input/output by performing its specific application function in a cooperative manner with other processing nodes across a commonly shared network.

Embodiments of autocratically (e.g. discriminatively) managing the separation and distribution of digital content and associated controls in a network of real-world connectable processing nodes includes handling requests from control devices by the nodes in a control device-specific way. This may enable capabilities such as users being limited to manipulating only a portion of content being presented through a real-world I/O device via one of the real-world connectable processing nodes (to which the I/O device connects). Discriminative methods and systems for content distribution and control are further described in co-pending application U.S. Ser. No. 14/149,541 filed Jan. 7, 2014.

An embodiment of heads-up content item selection of content presented on one or more output devices may include a plurality of uniquely identifiable control devices participating in a control session to control a portion of the presented content that is uniquely associated with the control device. A request to control such an associated content item may be received by a processing node (e.g. a host application configured node, and the like) that may connect directly to a real-world output device on which the content is presented. The processing node may be configured with a functional portion of a session application so that the processing node may execute the function in response to receiving the request. In an example, the request may be to manipulate a content interaction indicator that is presented on the output device and the function may facilitate updating the output display.

In another example, a processing node may be used, such as to provide a host server capability in a heads-down content item selection embodiment for providing a list of content items to a control device to be presented in its heads-down display. Upon the host server operative processing node (aka host node) receiving a user selection of a content item, the host node may communicate with another node that interfaces with a real-world display to cause the selected content item to be displayed. A processing node in this example may also provide a content list filtering function to generate a control device-specific list of content items. Such content list filtering may be based on a participant class of the control device, so that only content items that are compatible with the participant class are selectable on the control device.

Another embodiment of a processing node as described herein may include discriminative control for a plurality of players within a session for a multi-player game application. A processing node that connects to a real-world output display device may facilitate presenting a plurality of content items that are separately controlled by alternate unique control devices participating in the session. Each unique control device may communicate directly over a local network to the output-connected processing node, which may manipulate each separately controllable content item based on communication from the corresponding control device. The processing node may take on a host server role, a complete application role, a set of functions of the application, and the like.

Yet another embodiment of discriminative control device-specific content distribution and control session operation discriminative control for a plurality of participants for a party themed (e.g. DJ) application session may be embodied in a network of processing nodes as described herein. A processing node in the network may be configured with a function that facilitates handling of a plurality of party participants that share a common participant class (e.g. party guest). Such a function may effectively cause the plurality of party guest participants to be treated as a single guest so that requests for content items, content manipulation, and the like may be aggregated and coordinated. A resulting single guest view of this plurality of control devices may be communicated to a display output processing node that accepts this input and determines appropriate display related actions to take.

Procedure or method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques and approaches can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques and approaches can be implemented in a distributed computing system that includes a back-end component. The back-end component can, for example, be a data server, a middleware component, and/or an application server. The above described techniques and approaches can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and host servers. A client and a host server are generally remote from each other and typically interact through a communication network. The relationship of client and host server arises by virtue of computer programs running on the respective computers and having a client-host server relationship to each other.

Packet-based networks can include, for example, the Internet, a carrier Internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated in their entirety by reference.

The invention claimed is:

1. A method of configuring a control session, comprising:
    receiving a request to execute an input/output application from a content control application executing on a mobile control device, wherein the input/output application is associated with a peripheral;
    receiving a request from at least one other mobile control device to participate in the control session;
    aggregating a plurality of real-world connectable processing nodes into an application session set of processing nodes by allocating at least one function required by the input/output application for execution on each processing node in the set of processing nodes, wherein the set of processing nodes is determined based on processing requirements of the input/output application; and
    configuring, using the mobile control device, at least one node of the set of processing nodes to facilitate interfacing the input/output application with a real-world input/output device that is connected to the at least one processing node via the function of the at least one processing node, wherein configuring is based at least in part on input/output requirements of the input/output application.

2. The method of claim 1, wherein configuring at least one processing node includes instantiating the at least one function allocated to the at least one processing node.

3. The method of claim 1, wherein each processing node in the set of processing nodes exchanges information that is pertinent to the execution of the application via a messaging library that supports information abstraction to/from an information processing format from/to an information exchange format.

4. The method of claim 1, wherein configuring at least one node of the set of processing nodes includes at least one processing node performing the following steps:
    querying a remote server to discover other processing nodes;
    creating a representation of other processing nodes in a node-resident messaging library; and
    confirming availability to receive a function required by the input/output application.

5. The method of claim 1, wherein at least one processing node in the plurality of processing nodes does not participate in the set of processing nodes.

6. The method of claim 1, wherein at least one of the set of processing nodes is indirectly accessible by the mobile control device via another node of the set of processing nodes.

7. The method of claim 1, wherein the real-world input/output device that is connected to the at least one processing node is connected via at least one of an HDMI connection, an audio connection, a video capture connection, and a home appliance control connection.

8. The method of claim 3, wherein the first format is a processing node-specific format and the second format is a common network information exchange format.

9. An input/output processing system, comprising:
    a content control application executing on a mobile control device for configuring a content control session based on interpretation of user actions recorded by a user interface that is native to the mobile control device, wherein the content control session is configured with a content input/output application selected through the user interface, wherein the content input/output application is associated with a peripheral;
    a host content control application that is adapted to aggregate a plurality of real-world input/output processing nodes into a set of processing nodes for collectively executing the content input/output application;
    a plurality of functions that collectively determine the operation of the input/output application;
    a plurality of different types of input/output devices connected individually to distinct processing nodes in the set of processing nodes; and
    an application instantiation facility for identifying the set of processing nodes and for instantiating each function of the plurality of functions on distinct processing nodes in the set of processing nodes, wherein input/output requirements of each function of the plurality of functions is used to determine into which processing node the function is instantiated based on a class parameter of the distinct processing nodes.

10. The system of claim 9, wherein the class parameter identifies the type of input/output devices that are connected to the distinct processing nodes.

11. The system of claim 10, wherein a processing node adjusts its class parameter based on the instantiated function.

* * * * *